(12) United States Patent
Tsutsui et al.

(10) Patent No.: US 11,050,108 B2
(45) Date of Patent: Jun. 29, 2021

(54) BATTERY MODULE THAT COMPRISES LIQUID BATTERY AND SOLID BATTERY

(71) Applicant: Panasonic Intellectual Property Management Co., Ltd., Osaka (JP)

(72) Inventors: Yasutaka Tsutsui, Osaka (JP); Yuta Sugimoto, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/993,560

(22) Filed: May 30, 2018

(65) Prior Publication Data
US 2018/0366700 A1 Dec. 20, 2018

(30) Foreign Application Priority Data
Jun. 19, 2017 (JP) .............................. JP2017-119660

(51) Int. Cl.
*B60K 1/00* (2006.01)
*H01M 50/20* (2021.01)
(Continued)

(52) U.S. Cl.
CPC ............. *H01M 50/20* (2021.01); *B60L 50/64* (2019.02); *H01M 10/4207* (2013.01);
(Continued)

(58) Field of Classification Search
CPC .......... B60L 50/64; B60L 50/00; B60L 50/60; B60L 50/66; H01M 2/1077; H01M 2/1016; H01M 2/1094; H01M 2/14; H01M 2/1027; H01M 2/0245; H01M 10/00; H01M 10/4207; H01M 10/4235; H01M 10/42; H01M 12/00; H01M 12/02; H01M 2300/00; H01M 2300/0065; H01M 2300/0002; H01M 2300/0017; H01M 2220/20; H01M 10/056; H01M 10/0562; H01M 10/0563; H01M 10/0566; H01M 16/00

See application file for complete search history.

(56) References Cited

U.S. PATENT DOCUMENTS 5,196,275 A * 3/1993 Goldman ................ H01M 4/02
429/402
5,753,384 A 5/1998 Kimberg
(Continued)

FOREIGN PATENT DOCUMENTS

EP 3 419 102 A1 12/2018
JP 2004-039523 2/2004
(Continued)

OTHER PUBLICATIONS

Non-Final Office Action issued in U.S. Appl. No. 16/391,978, dated Apr. 29, 2020.
(Continued)

*Primary Examiner* — James M Dolak
(74) *Attorney, Agent, or Firm* — McDermott Will & Emery LLP

(57) ABSTRACT

A battery module includes a first liquid battery and a first solid battery. The first liquid battery is a unit cell. The first solid battery is a unit cell that has a larger volume than a volume of the first liquid battery.

18 Claims, 8 Drawing Sheets

(51) Int. Cl.
  *H01M 10/42* (2006.01)
  *B60L 50/64* (2019.01)
  *H01M 12/00* (2006.01)

(52) U.S. Cl.
  CPC ........ *H01M 10/4235* (2013.01); *H01M 12/00* (2013.01); *H01M 2220/20* (2013.01); *H01M 2300/0002* (2013.01); *H01M 2300/0017* (2013.01); *H01M 2300/0065* (2013.01)

(56) References Cited

U.S. PATENT DOCUMENTS

| | | | | |
|---|---|---|---|---|
| 5,866,274 | A * | 2/1999 | Mawston | H01M 2/043 429/9 |
| 6,074,774 | A | 6/2000 | Semmens et al. | |
| 6,238,813 | B1 * | 5/2001 | Maile | A61N 1/378 429/176 |
| 6,376,128 | B1 | 4/2002 | Goto | |
| 7,570,012 | B2 * | 8/2009 | Dasgupta | B60L 58/20 320/104 |
| 7,679,314 | B2 * | 3/2010 | Elder | B60L 3/0046 307/10.7 |
| 7,887,955 | B2 * | 2/2011 | Saruwatari | H01M 2/06 429/211 |
| 8,889,285 | B2 * | 11/2014 | Sastry | H01M 2/1077 429/152 |
| 9,263,779 | B2 * | 2/2016 | Lee | H01M 12/08 |
| 9,312,522 | B2 * | 4/2016 | Bradwell | H01M 4/56 |
| 9,553,346 | B2 * | 1/2017 | Hermann | H01M 10/633 |
| 9,819,053 | B1 | 11/2017 | Zimmerman | |
| 10,008,708 | B2 * | 6/2018 | Wu | H01M 2/206 |
| 10,050,303 | B2 * | 8/2018 | Anandan | H01M 10/0562 |
| 10,177,348 | B2 * | 1/2019 | Takahata | H01M 2/024 |
| 10,541,442 | B2 * | 1/2020 | Iwasaki | H01M 10/0568 |
| 10,593,994 | B2 * | 3/2020 | Yokoyama | H01M 10/056 |
| 10,615,382 | B2 * | 4/2020 | Takasaki | H01M 2/1061 |
| 10,615,410 | B2 * | 4/2020 | Essaki | H01M 4/386 |
| 10,741,896 | B2 * | 8/2020 | Ishii | H01M 10/0525 |
| 10,749,156 | B2 * | 8/2020 | Newman | H01M 2/1055 |
| 10,873,106 | B2 * | 12/2020 | Miller | H01M 10/0585 |
| 2003/0072996 | A1 | 4/2003 | Roh | |
| 2003/0186116 | A1 | 10/2003 | Tanjou | |
| 2014/0234685 | A1 | 8/2014 | Nitta et al. | |
| 2015/0280218 | A1 | 10/2015 | Zimmerman et al. | |
| 2015/0349379 | A1 | 12/2015 | Hozumi et al. | |
| 2016/0226053 | A1 | 8/2016 | Wu et al. | |
| 2016/0308243 | A1 * | 10/2016 | Herle | H01M 4/505 |
| 2017/0133731 | A1 | 5/2017 | Hermann | |
| 2017/0348652 | A1 | 12/2017 | Ishigaki et al. | |

FOREIGN PATENT DOCUMENTS

| | | |
|---|---|---|
| JP | 2012-234749 | 11/2012 |
| JP | 2015-125919 | 7/2015 |

OTHER PUBLICATIONS

Extended European Search Report dated Jul. 26, 2019 for the related European Patent Application No. 19171718.0.

Final Office Action issued in U.S. Appl. No. 16/391,978, dated Aug. 31, 2020.

* cited by examiner

BATTERY MODULE THAT COMPRISES LIQUID BATTERY AND SOLID BATTERY

BACKGROUND

1. Technical Field

The present disclosure relates to a battery module that has a hybrid structure including one or more liquid batteries and one or more solid batteries and to a vehicle.

2. Description of the Related Art

Japanese Patent No. 4075487 and Japanese Unexamined Patent Application Publication No. 2015-125919 disclose a structure in which liquid batteries and all-solid batteries are alternately arranged.

SUMMARY

A battery module including liquid batteries and all-solid batteries is problematic in that if one liquid battery catches fire, the fire spreads to other liquid batteries.

One non-limiting and exemplary embodiment provides a battery module that can suppress the spread of fire from one liquid battery to other liquid batteries.

In one general aspect, the techniques disclosed here feature a battery module that includes a first liquid battery and a first solid battery. The first liquid battery is a unit cell. The first solid battery is a unit cell that has a larger volume than a volume of the first liquid battery.

According to one aspect of the present disclosure, a highly reliable battery module, which can suppress the spread of fire from one liquid battery to other liquid batteries, can be implemented.

It should be noted that comprehensive or specific aspects of the present disclosure may be implemented as a battery module, a vehicle, an apparatus, a system, a method, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1A:
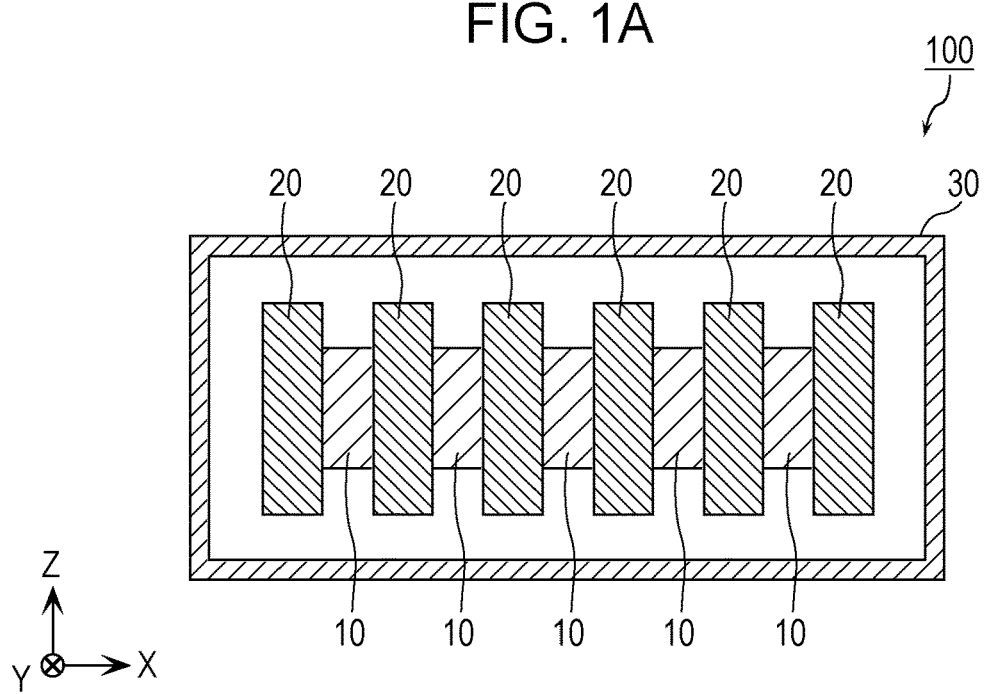
FIG. 1A is a schematic cross-sectional view when a battery module according to a first embodiment is cut along a plane parallel to the Z-X plane.

Underlying Knowledge Forming Basis of the Present Disclosure

A liquid battery that uses an electrolyte solution or a gel electrolyte including an electrolyte solution and a macromolecular compound is flammable. Therefore, if a plurality of liquid batteries are adjacently disposed, fire in one liquid battery may spread to other liquid batteries. In contrast, a battery that uses a solid electrolyte is difficult to burn because neither an electrolyte solution nor a gel electrolyte is used.

Japanese Patent No. 4075487 or Japanese Unexamined Patent Application Publication No. 2015-125919 discloses a structure in which liquid batteries and all-solid batteries are alternately arranged. With this type of structure, even if safety devices are not used for liquid batteries, a highly safe battery module can be provided. However, in a case that liquid batteries and all-solid batteries are accommodated in a battery case, there is a space around the liquid batteries and all-solid batteries, allowing air to flow in the space. Therefore, if one liquid battery catches fire, the fire may proceed beyond all-solid batteries together with the flow of the air and may extend to other liquid batteries.

To address this problem, a battery module according to an aspect of the present disclosure has a first liquid battery and a first solid battery. The first solid battery is larger than the first liquid battery. The first solid battery may be disposed in contact with the first liquid battery.

Thus, even if the first liquid battery catches fire, the fire does not easily spread to other liquid batteries because the first solid battery functions as a barrier. That is, a highly reliable battery module is implemented. The first liquid battery may be a unit cell. The first solid battery may be a unit cell having a larger volume than a volume of the first liquid battery. The first solid battery may not be in contact with the first liquid battery. For example, there may be a space between the first solid battery and the first liquid battery. A plurality of solid batteries including the first solid battery may be arranged in succession. A plurality of liquid batteries including the first liquid battery may be arranged in succession. The first solid battery may include an inorganic solid electrolyte or may include an organic solid electrolyte. There is no particular limitation on the shape of the first solid battery. The shape of the first solid battery may be, for example, a cube, a rectangular parallelepiped, or a cylinder. There is also no particular limitation on the shape of the first liquid battery. The shape of the first liquid battery may be, for example, a cube, a rectangular parallelepiped, or a cylinder.

For example, the battery module further includes a second solid battery. The second solid battery is larger than the first liquid battery. The second solid battery may be disposed in contact with the first liquid battery. The first liquid battery is sandwiched between the first solid battery and the second solid battery.

Thus, even if the first liquid battery catches fire, the fire does not easily spread to other liquid batteries because the first solid battery and second solid battery between which the first liquid battery is sandwiched function as a barrier. That is, a highly reliable battery module is implemented. The second solid battery may be a unit cell having a larger volume than the volume of the first liquid battery. The second solid battery may not be in contact with the first liquid battery. For example, there may be a space between the second solid battery and the first liquid battery. A plurality of solid batteries including the second solid battery may be arranged in succession. The second solid battery may include an inorganic solid electrolyte or may include an organic solid electrolyte. There is no particular limitation on the shape of the second solid battery. The shape of the second solid battery may be, for example, a cube, a rectangular parallelepiped, or a cylinder.

The battery module further includes a battery case that accommodates the first liquid battery, the first solid battery, and the second solid battery. The side surfaces of the first solid battery and the side surfaces of the second solid battery are in contact with the inner surfaces of the battery case. The first liquid battery is disposed in a closed space enclosed by the main surface of the first solid battery, the main surface of the second solid battery, and the inner surfaces of the battery case.

Thus, since the first liquid battery is disposed in the closed space, even if the first liquid battery catches fire, the fire is not easily spread to other liquid batteries. That is, a highly reliable battery module is implemented.

For example, the first solid battery covers the main surface and one or more side surfaces of the first liquid battery.

Thus, since the main surface and the one or more side surfaces of the first liquid battery are covered with the first solid battery, which does not easily catch fire, even if the first liquid battery catches fire, the fire does not easily spread to other liquid batteries. That is, a highly reliable battery module is implemented.

For example, the battery module further includes a third solid battery. The first solid battery covers the main surface of the first liquid battery and the third solid battery covers the one or more side surfaces of the first liquid battery.

Thus, since the main surface and the one or more side surfaces of the first liquid battery are covered with the first solid battery and third solid battery, which do not easily catch fire, even if the first liquid battery catches fire, the fire does not easily spread to other liquid batteries. That is, a highly reliable battery module is implemented.

For example, the first liquid battery includes an electrolyte solution including an organic substance, and the first solid battery includes a solid electrolyte. The first liquid battery may include no solid electrolyte, or include a smaller amount, in mass, of the solid electrolyte than an amount, in mass, of the solid electrolyte in the first solid battery. The first solid battery may include no electrolyte solution, or include a smaller amount, in mass, of the electrolyte solution than an amount, in mass, of the electrolyte solution in the first liquid battery.

Thus, even if the first liquid battery catches fire, the fire does not easily spread to other liquid batteries because the first solid battery includes no electrolyte solution, or includes a smaller amount, in mass, of the electrolyte solution than an amount, in mass, of the electrolyte solution in the first liquid battery. Thus, the first solid battery functions as a barrier that does not easily catch fire. That is, a highly reliable battery module is implemented.

For example, the first solid battery lacks the electrolyte solution.

Thus, even if the first liquid battery catches fire, the fire does not easily spread to other liquid batteries because the first solid battery that lacks an electrolyte solution and thereby does not easily catch fire functions as a barrier. That is, a highly reliable battery module is implemented.

For example, the first liquid battery lacks the solid electrolyte.

Thus, even if the first liquid battery that lacks a solid electrolyte catches fire, the fire does not easily spread to other liquid batteries. That is, a highly reliable battery module is implemented.

For example, the battery module further includes a second liquid battery. The first solid battery is disposed between the first liquid battery and the second liquid battery. The first solid battery may be in contact with the first liquid battery and the second liquid battery.

Thus, even if the first liquid battery catches fire, the fire does not easily spread to the second liquid battery because the first solid battery functions as a barrier. That is, a highly reliable battery module is implemented. The second liquid battery may be a unit cell. The second liquid battery may have a smaller volume than the volume of the first solid battery. The first solid battery may not be in contact with the second liquid battery. For example, there may be a space between the first solid battery and the second liquid battery. A plurality of liquid batteries including the second liquid battery may be arranged in succession. There is no particular limitation on the shape of the second liquid battery. The shape of the second liquid battery may be, for example, a cube, a rectangular parallelepiped, or a cylinder.

Embodiments will be described below with reference to the drawings. All embodiments described below illustrate general or specific examples. Numerals, shapes, materials, constituent elements, the placement positions and connection forms of these constituent elements, steps, the sequence of these steps, and the like are only examples, and are not intended to restrict the present disclosure. Of the constituent elements described in the embodiments below, constituent elements not described in independent claims, each of which indicates the topmost concept, will be described as optional constituent elements.

Each drawing is a schematic drawing and is not necessarily drawn in a rigorous manner. In all drawings, the essentially same constituent elements are denoted by the same numerals and repeated descriptions will be omitted or simplified.

In the drawings referenced in the embodiments described below, coordinate axes may be indicated. The X-axis direction of the coordinate axes will be described as, for example, the thickness direction of a solid battery and a liquid battery. The Y-axis direction will be described as the horizontal direction of the solid battery and the liquid battery, and Z-axis direction will be described as the vertical direction of the solid battery and the liquid battery. A surface parallel to the Y-Z plane of the solid battery and the liquid battery will be described as a main surface. In other words, a main surface is an upper surface or a lower surface. A pair of the widest surfaces are main surfaces. Surfaces of the solid battery and the liquid battery other than the main surfaces will be described as the side surfaces.

First Embodiment

Structure

Figure 1B:
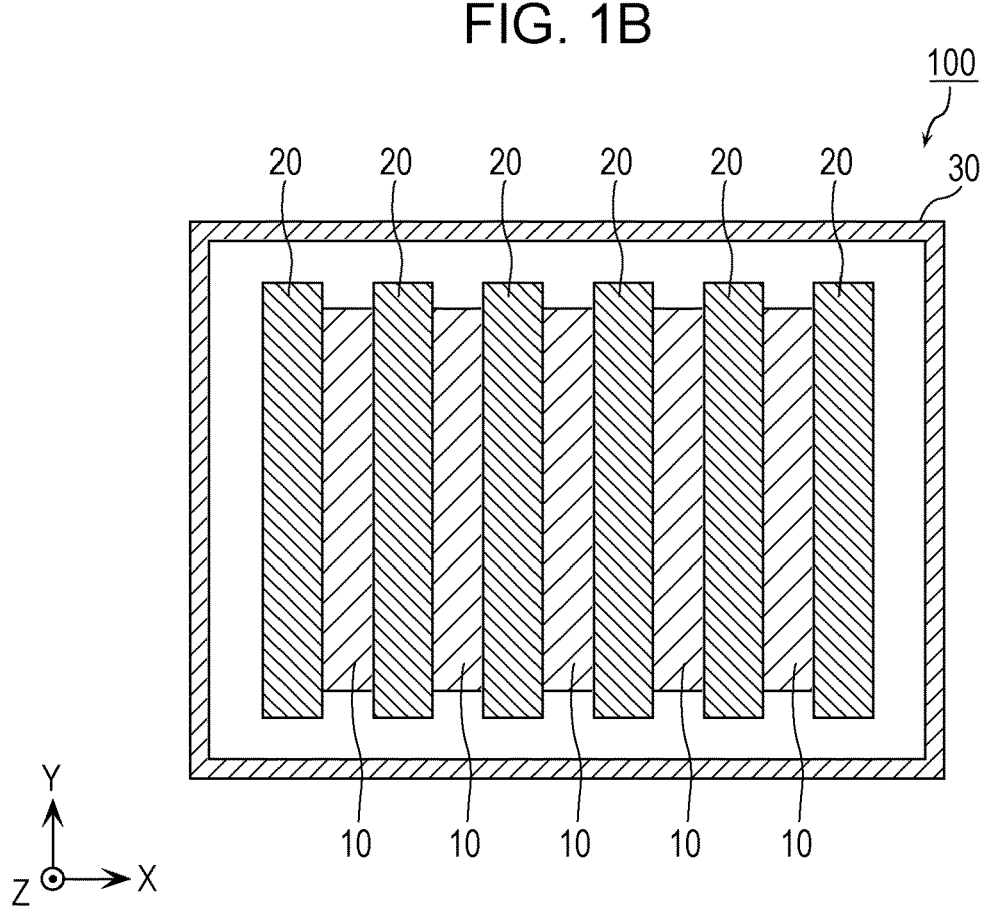
FIG. 1B is a schematic cross-sectional view when the battery module according to the first embodiment is cut along a plane parallel to the X-Y plane.
Figure 1C:
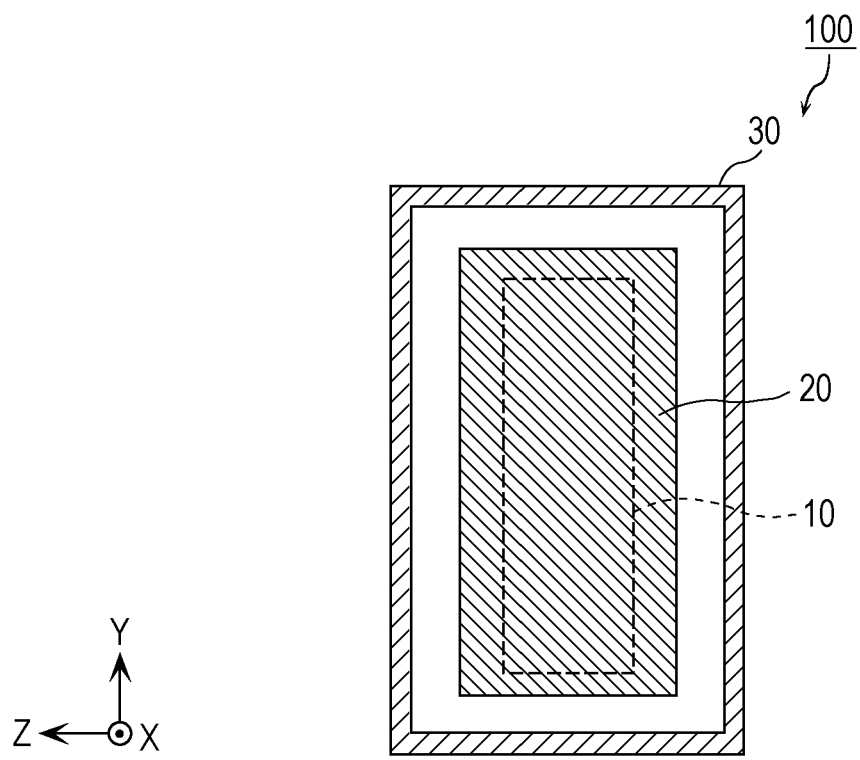
FIG. 1C is a schematic cross-sectional view when the battery module according to the first embodiment is cut along a plane parallel to the Y-Z plane.

The structure of a battery module according to a first embodiment will be described below with reference to the drawings. FIG. 1A is a schematic cross-sectional view when the battery module according to the first embodiment is cut along a plane parallel to the Z-X plane. FIG. 1B is a schematic cross-sectional view when the battery module according to the first embodiment is cut along a plane parallel to the X-Y plane. FIG. 1C is a schematic cross-sectional view when the battery module according to the first embodiment is cut along a plane parallel to the Y-Z plane.

As illustrated in FIGS. 1A to 1C, a battery module 100 according to the first embodiment has a plurality of liquid batteries 10, a plurality of solid batteries 20, and a battery case 30. Alternatively, the battery module 100 may include at least one liquid battery 10 and at least one solid battery 20. There is no particular limitation on the number of liquid batteries 10 and solid batteries 20 included in the battery module 100.

Each of the liquid batteries 10, which is an example of a first liquid battery or a second liquid battery, includes a larger amount of liquid electrolyte (i.e., electrolyte solution) including an organic substance than that of the solid battery 20. A liquid prepared by dissolving an electrolyte in a solvent formed from an organic substance, for example, is used as the electrolyte solution. A known organic solvent material used to prepare a battery electrolyte solution may be used as the organic substance employed as a solvent. A known electrolyte material used to prepare a battery electrolyte solution may be used as the electrolyte. The liquid battery 10 may include no solid electrolyte. The liquid battery 10 may be a unit cell.

The liquid battery 10 is shaped like a flat rectangular parallelepiped (e.g., rectangular plate), the thickness direction of the liquid battery 10 being the X-axis direction. For example, the length of the liquid battery 10 in the Z-axis direction (vertical direction) is about 26.5 mm, the length in the X direction (thickness direction) is about 1 mm, and the length in the Y direction (horizontal direction) is about 148 mm. However, the liquid battery 10 may be formed in another shape and may have another size.

Each of the solid batteries 20, which is an example of a first solid battery or a second solid battery, includes a larger amount of solid electrolyte than that of the liquid battery 10. The solid battery 20 is, for example, an all-solid battery, which includes no liquid electrolyte. A known solid electrolyte material for use in a battery may be used as the solid electrolyte. The solid electrolyte may be inorganic or may be organic. The solid battery 20 may be a unit cell.

The solid battery 20 is shaped like a flat rectangular parallelepiped (e.g., rectangular plate), the thickness direction of the solid battery 20 being the X-axis direction. For example, the length of the solid battery 20 in the Z-axis direction (vertical direction) is about 32.5 mm, the direction in the X direction (thickness direction) is about 1 mm, and the direction in the Y direction (horizontal direction) is about 154 mm. That is, the solid battery 20 has a larger outside shape (i.e., volume) than the liquid battery 10. However, the solid battery 20 may be formed in another shape and may have another size as long as the solid battery 20 has a larger volume than the volume of the liquid battery 10.

Although not illustrated in detail, the liquid battery 10 and the solid battery 20 each include a positive electrode layer and a negative electrode layer besides an electrolyte layer including an electrolyte solution. The electrolyte layer is interposed between the positive electrode layer and the negative electrode layer. Each of the liquid battery 10 and the solid battery 20 may be a unit cell.

The positive electrode layer includes a positive electrode active material that can occlude and release metal ions (lithium ions, for example). A known active material for the positive electrode of a battery may be used as the positive electrode active material.

The negative electrode layer includes a negative electrode active material that can occlude and release metal ions (lithium ions, for example). A known active material for the negative electrode of a battery may be used as the negative electrode active material.

Each of the liquid battery 10 and the solid battery 20 is implemented as a battery cell formed by, for example, sealing a laminated body composed of a positive electrode layer, a negative electrode layer, and an electrolyte layer in an outer package. Specifically, each of the liquid battery 10 and the solid battery 20 is implemented as, for example, a lithium secondary battery cell.

The battery case 30 is a hollow case in which the plurality of liquid batteries 10 and the plurality of solid batteries 20 are accommodated. The battery case 30 is in a substantially rectangular parallelepiped shape. The battery case 30 may be made of a metal material or a resin material.

Placement of Liquid Batteries and Solid Batteries

In the battery case 30, the plurality of liquid batteries 10 and the plurality of solid batteries 20 are alternately disposed in such a way that their main surfaces are in contact with each other. Specifically, each solid battery 20 is disposed in contact with adjacent liquid batteries 10. For example, one liquid battery 10 is sandwiched between two solid batteries 20. One solid battery 20 is disposed between two liquid batteries 10 so as to be in contact with the two liquid batteries 10. At least part of the plurality of liquid batteries 10 may be arranged in succession. That is, two or more liquid batteries 10 may be sandwiched between two solid batteries 20, and/or two or more liquid batteries 10 may be disposed in succession at an end of the battery string. At least part of the plurality of solid batteries 20 may be arranged in succession. That is, two or more solid batteries 20 may be sandwiched between two liquid batteries 10, and/or two or more solid batteries 20 may be disposed in succession at an end of the battery string. At least one liquid battery 10 may not be in contact with any solid battery 20. One or more support members that support the plurality of liquid batteries 10 and the plurality of solid batteries 20 may be provided in the battery case 30.

The outer shape of the solid battery 20 has a size larger than the outer shape of the liquid battery 10. The distance from a side surface of the liquid battery 10 to an inner surface of the battery case 30 is longer than the distance from a side surface of the solid battery 20 to the inner surface of the battery case 30. As illustrated in FIG. 1C, the liquid battery 10 entirely overlaps with a part of the solid battery 20 when viewed from a direction perpendicular to the main surface of the liquid battery 10. The distance from the side surface of the liquid battery 10 to the inner surface of the battery case 30 may be 5 mm or longer. The distance from the side surface of the solid battery 20 to the inner surface of the battery case 30 may be 5 mm or longer.

In the structure described above, the solid battery 20, which is less likely to catch fire and is larger than the liquid battery 10, is disposed between liquid batteries 10, which may catch fire, so the solid battery 20 functions as a fire wall. Therefore, it is possible to implement the highly reliable battery module 100 that suppresses the spread of fire from one liquid battery 10 to other liquid batteries 10. The solid battery 20 may have a single-layer structure or may have a laminated structure.

Second Embodiment

Placement of Liquid Batteries and Solid Batteries in a Second Embodiment

Figure 2A:
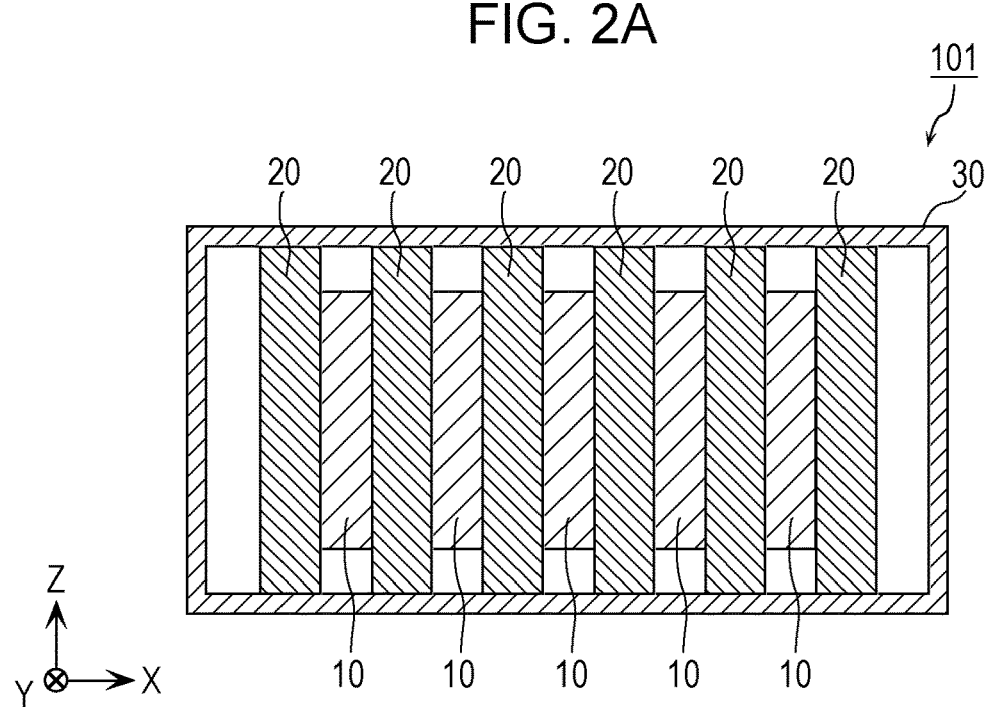
FIG. 2A is a schematic cross-sectional view when a battery module according to a second embodiment is cut along a plane parallel to the Z-X plane.
Figure 2B:
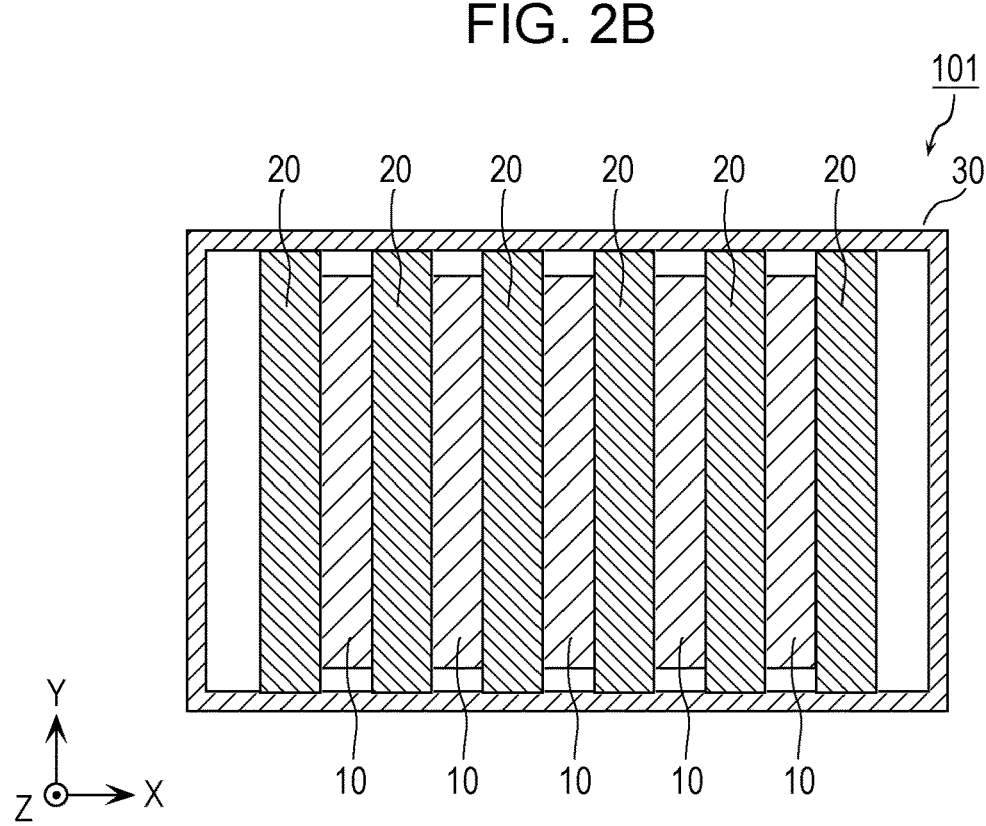
FIG. 2B is a schematic cross-sectional view when the battery module according to the second embodiment is cut along a plane parallel to the X-Y plane.
Figure 2C:
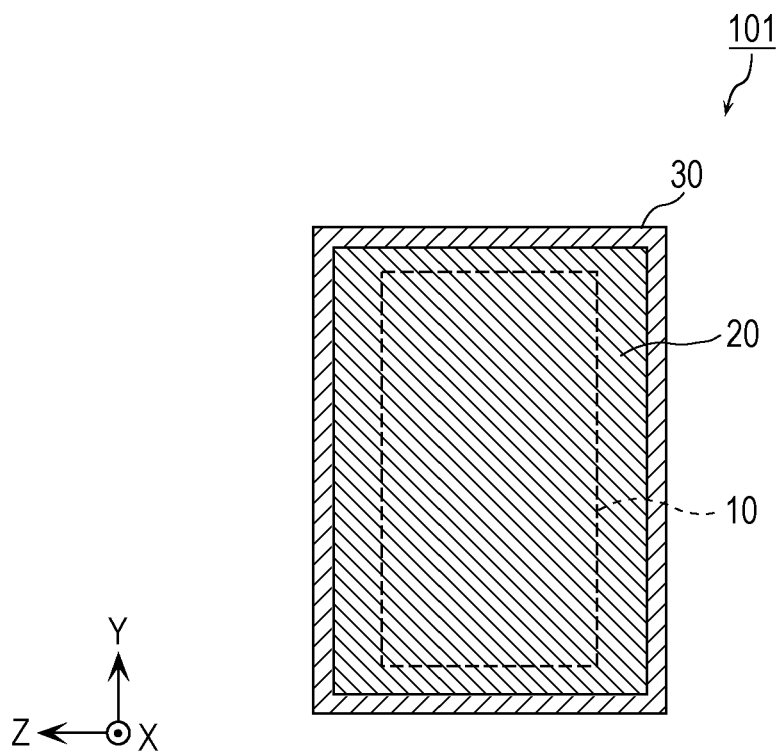
FIG. 2C is a schematic cross-sectional view when the battery module according to the second embodiment is cut along a plane parallel to the Y-Z plane.

Next, a battery module according to a second embodiment will be described. FIG. 2A is a schematic cross-sectional view when the battery module according to the second embodiment is cut along a plane parallel to the Z-X plane. FIG. 2B is a schematic cross-sectional view when the battery module according to the second embodiment is cut along a plane parallel to the X-Y plane. FIG. 2C is a schematic cross-sectional view when the battery module according to the second embodiment is cut along a plane parallel to the Y-Z plane. In the second embodiment, differences from the first embodiment will be mainly described and repeated descriptions will be omitted.

As illustrated in FIGS. 2A to 2C, a battery module 101 according to the second embodiment has the plurality of liquid batteries 10, a plurality of solid batteries 20, and the battery case 30 in which the plurality of liquid batteries 10 and the plurality of solid batteries 20 are accommodated. Alternatively, the battery module 101 may include at least one liquid battery 10 and at least one solid battery 20. There is no particular limitation on the number of liquid batteries 10 and solid batteries 20 included in the battery module 101.

In the battery case 30, the plurality of liquid batteries 10 and the plurality of solid batteries 20 are alternately disposed in such a way their main surfaces are in contact with each other. Specifically, each solid battery 20 is disposed in contact with adjacent liquid batteries 10. For example, one liquid battery 10 is sandwiched between two solid batteries 20.

The solid battery 20 has a size larger than the liquid battery 10. The side surfaces of the solid battery 20 are in contact with the inner surfaces of the battery case 30. The solid battery 20 may be formed integrally with the battery case 30. Each liquid battery 10 is disposed in a closed space enclosed by the main surfaces of two solid batteries 20 and the inner surfaces of the battery case 30. In this disclosure, the closed space may be a substantially closed space; it is not a necessity that the closed space is a sealed space. The closed space in this disclosure may be a sealed space.

In the structure described above, the liquid battery 10, which may catch fire, is disposed in a closed space formed by solid batteries 20, which are less likely to catch fire, and the battery case 30, so even if one liquid battery 10 catches fire, the possibility that the fire spreads to other liquid batteries 10 is very low. That is, it is possible to implement the highly reliable battery module 101 that suppresses the spread of fire from one liquid battery 10 to other liquid batteries 10. At least part of the plurality of liquid batteries 10 may be arranged in succession. That is, two or more liquid batteries 10 may be sandwiched between two solid batteries 20, and/or, two or more liquid batteries 10 may be disposed in succession at an end of the battery string. In this case as well, it is possible to suppress the spread of fire between the two or more liquid batteries 10 and other liquid batteries 10. At least part of the plurality of solid batteries 20 may be arranged in succession. That is, two or more solid batteries 20 may be sandwiched between two liquid batteries 10, and/or, two or more solid batteries 20 may be disposed in succession at an end of the battery string. At least one liquid battery 10 may not be in contact with any solid battery 20. One or more support members that support the plurality of liquid batteries 10 and the plurality of solid batteries 20 may be provided in the battery case 30. The solid battery 20 may have a single-layer structure or may have a laminated structure.

Third Embodiment

Placement of Liquid Batteries and Solid Batteries in a Third Embodiment

Figure 3A:
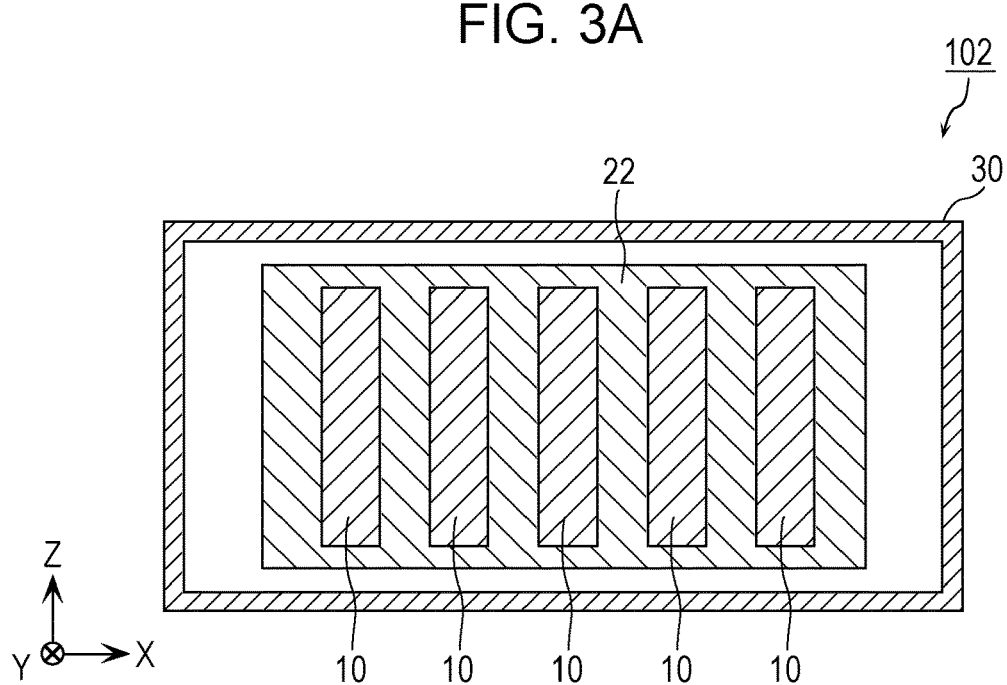
FIG. 3A is a schematic cross-sectional view when a battery module according to a third embodiment is cut along a plane parallel to the Z-X plane.
Figure 3B:
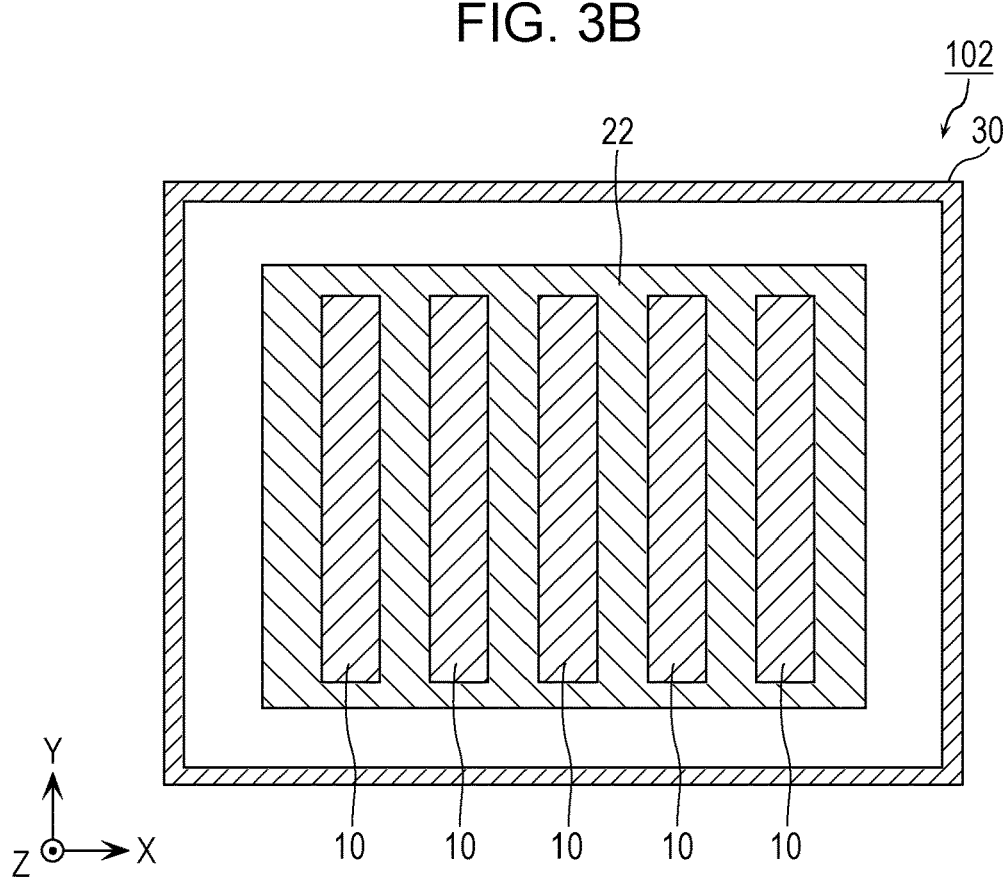
FIG. 3B is a schematic cross-sectional view when the battery module according to the third embodiment is cut along a plane parallel to the X-Y plane.
Figure 3C:
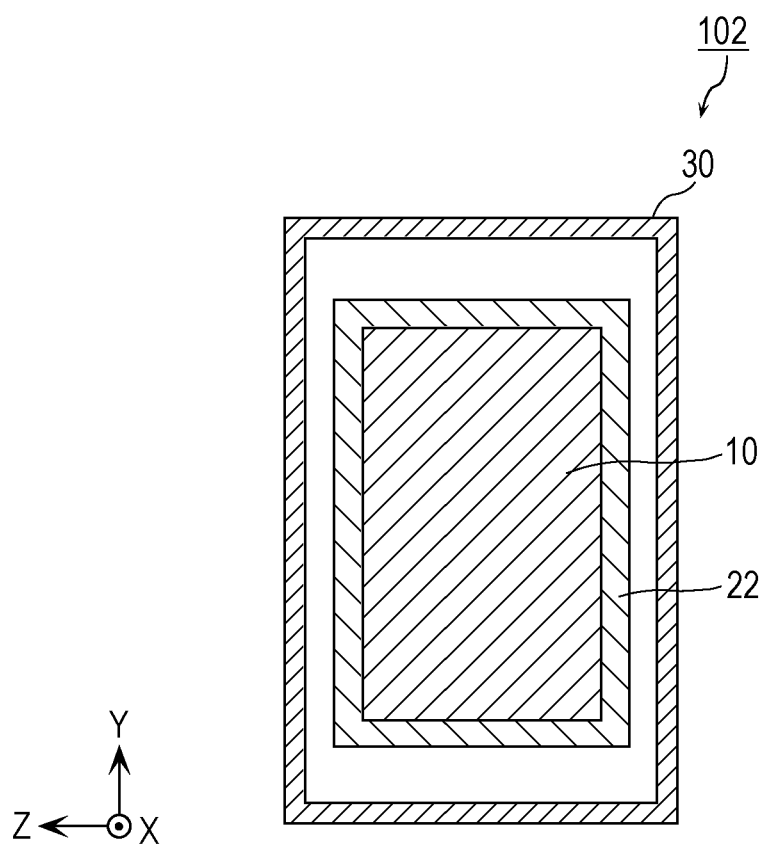
FIG. 3C is a schematic cross-sectional view when the battery module according to the third embodiment is cut along a plane parallel to the Y-Z plane.

Next, a battery module according to a third embodiment will be described. FIG. 3A is a schematic cross-sectional view when the battery module according to the third embodiment is cut along a plane parallel to the Z-X plane. FIG. 3B is a schematic cross-sectional view when the battery module according to the third embodiment is cut along a plane parallel to the X-Y plane. FIG. 3C is a schematic cross-sectional view when the battery module according to the third embodiment is cut along a plane parallel to the Y-Z plane. In the third embodiment, differences from the first and second embodiments will be mainly described and repeated descriptions will be omitted.

As illustrated in FIGS. 3A to 3C, a battery module 102 according to the third embodiment has the plurality of liquid batteries 10, a solid battery 22, and the battery case 30 in which the plurality of liquid batteries 10 and the solid battery 22 are accommodated. Alternatively, the battery module 102 may include at least one liquid battery 10. There is no particular limitation on the number of liquid batteries 10 included in the battery module 102.

The solid battery 22 has spaces in which liquid batteries 10 are accommodated so as to be enclosed. Each of the plurality of liquid batteries 10 is disposed in one space. This space has almost the same outer shape and size as the liquid battery 10. Therefore, the solid battery 22 is in contact with the main surfaces and the side surfaces of each of the plurality of liquid batteries 10 and covers the main surfaces and the side surfaces of each of the plurality of liquid batteries 10. All the surfaces of each liquid battery 10 may be covered by the solid battery 22. Since the plurality of liquid batteries 10 are covered by the solid battery 22, the plurality of liquid batteries 10 are invisible to the outside. Part of the solid battery 22 is interposed between one liquid battery 10 and another liquid battery 10.

In the structure described above, each liquid battery 10, which may catch fire, is entirely covered by the solid battery 22, which is less likely to catch fire, so even if one liquid battery 10 catches fire, the possibility that the fire spreads to other liquid batteries 10 is very low. That is, it is possible to implement the highly reliable battery module 102 that suppresses the spread of fire from one liquid battery 10 to other liquid batteries 10. At least part of the plurality of liquid batteries 10 may be arranged in succession. At least one liquid battery 10 may not be in contact with the solid battery 22. One or more support members that support the plurality of liquid batteries 10 and the solid battery 22 may be provided in the battery case 30. The solid battery 22 may be composed of a plurality of unit cells. The solid battery 22 may have a single-layer structure or may have a laminated structure.

Variations of the Battery Module According to the Third Embodiment

Figure 4:
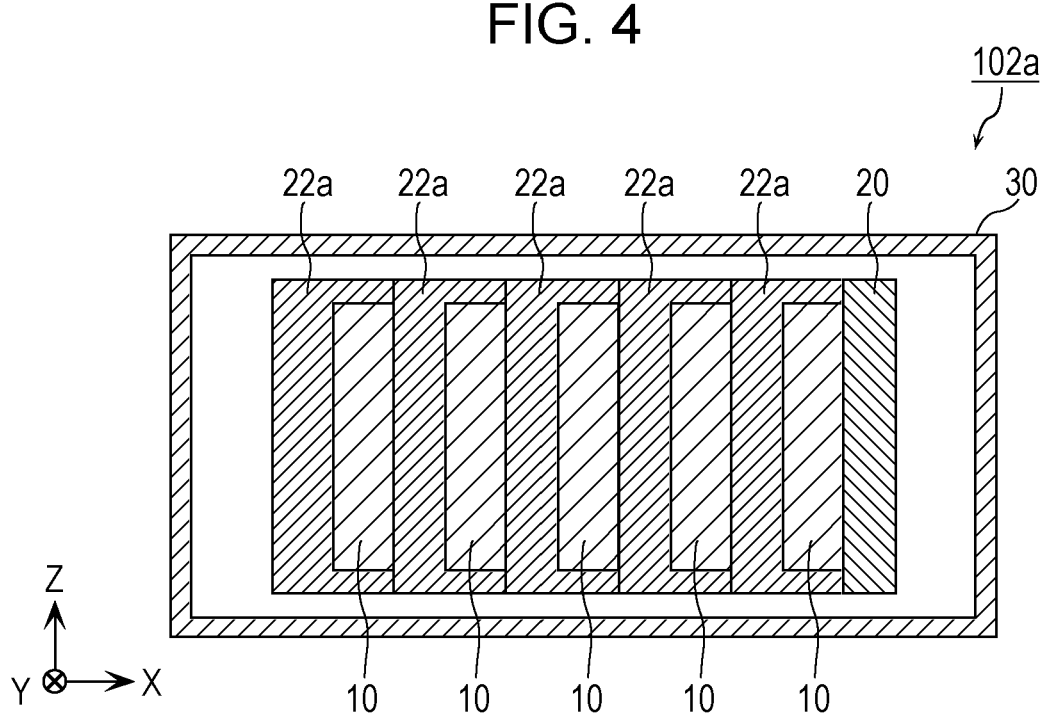
FIG. 4 is a schematic cross-sectional view when a battery module according to a first variation of the third embodiment is cut along a plane parallel to the Z-X plane.

Although, in the battery module 102, the main surfaces and the side surfaces of each of the plurality of liquid batteries 10 are covered with a single solid battery 22, the main surfaces and the side surfaces of each of the plurality of liquid batteries 10 may be covered with a plurality of solid batteries. FIG. 4 is a schematic cross-sectional view when a battery module according to a first variation of the third embodiment described above is cut along a plane parallel to the Z-X plane.

As illustrated in FIG. 4, a battery module 102a according to the first variation of the third embodiment has the plurality of liquid batteries 10, the solid battery 20, a plurality of solid batteries 22a, and the battery case 30 in which the plurality of liquid batteries 10, the solid battery 20, and the plurality of solid batteries 22a are accommodated.

In the battery module 102a, the solid battery 22 is implemented by the plurality of solid batteries 22a and the solid battery 20. Each of the solid batteries 22a is an example of the first solid battery or second solid battery. The solid battery 22a has an electrolyte similar to the electrolyte of, for example, the solid battery 20. The solid battery 22a may be a unit cell.

Each solid battery 22a has a concave part in which one liquid battery 10 is accommodated. The concave part has almost the same outer shape and size as the liquid battery 10. When the liquid battery 10 is accommodated in the concave part of one solid battery 22a, the main surface of the liquid battery 10, the main surface not being in contact with the one solid battery 22a, is in contact with the bottom surface of another solid battery 22a. The main surface of the liquid battery 10 at the positive end of the X axis, the main surface not being in contact with any solid battery 22a, is in contact with the main surface of the solid battery 20 in a rectangular parallelepiped shape.

In the structure described above, each liquid battery 10, which may catch fire, is entirely covered by the solid battery 22 and the solid battery 22a or the covered by solid batteries 22a. The solid battery 22 and the solid batteries 22a are less likely to catch fire, so even if one liquid battery 10 catches fire, the possibility that the fire spreads to other liquid batteries 10 is very low. That is, it is possible to implement the highly reliable battery module 102a that suppresses the spread of fire from one liquid battery 10 to other liquid batteries 10. At least part of the plurality of liquid batteries 10 may be arranged in succession. That is, two or more liquid batteries 10 may be accommodated in the concave part of a single solid battery 22a. At least one liquid battery 10 may not be in contact with any solid battery 22a. One or more support members that support the plurality of liquid batteries 10, the plurality of solid batteries 22a, and the solid battery 20 may be provided in the battery case 30.

Figure 5:
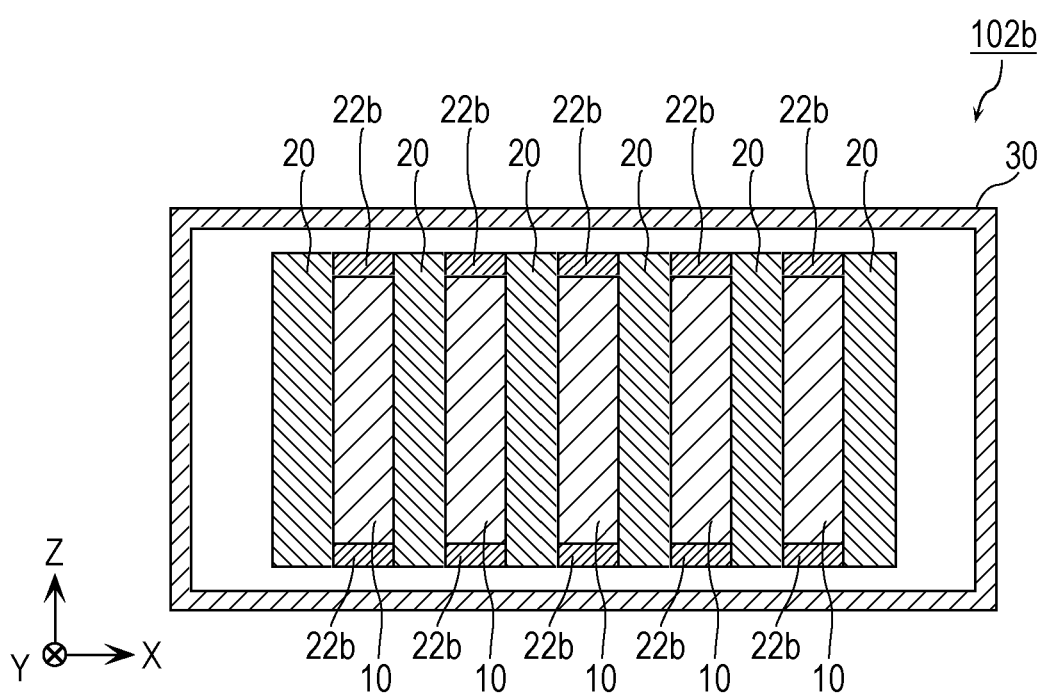
FIG. 5 is a schematic cross-sectional view when a battery module according to a second variation of the third embodiment is cut along a plane parallel to the Z-X plane.

The solid battery 22a may be implemented by adding, to the battery module 100, at least one solid battery that covers at least one side surface of the liquid battery 10. FIG. 5 is a schematic cross-sectional view when a battery module according to a second variation of the third embodiment is cut along a plane parallel to the Z-X plane.

As illustrated in FIG. 5, a battery module 102b according to the second variation of the third embodiment has the plurality of liquid batteries 10, the plurality of solid batteries 20, a plurality of solid batteries 22b, and the battery case 30 in which the plurality of liquid batteries 10, the plurality of solid batteries 20, and the plurality of solid batteries 22b are accommodated.

In the battery module 102b, the side surfaces of each of the plurality of liquid batteries 10 are covered by a plurality of solid batteries 22b. Each of the plurality of solid batteries 22b is an example of a third solid battery. The solid battery 22b has an electrolyte similar to the electrolyte of, for example, the solid battery 20. The solid battery 22b may be a unit cell.

Each of the plurality of solid batteries 22b is disposed between two solid batteries 20 and at one end of one liquid battery 10. Four solid batteries 22b are disposed for a single liquid battery 10 in correspondence to four directions so that they surround the liquid battery 10 from the four directions. Alternatively, a single solid battery 22b in a rectangular ring shape that encloses the four surfaces may be disposed for a single liquid battery 10.

In the structure described above, each liquid battery 10, which may catch fire, is entirely covered by solid batteries 20 and solid batteries 22b, which are less likely to catch fire, so even if one liquid battery 10 catches fire, the possibility that the fire spreads to other liquid batteries 10 is very low. That is, it is possible to implement the highly reliable battery module 102b that suppresses the spread of fire from one liquid battery 10 to other liquid batteries 10. At least part of the plurality of liquid batteries 10 may be arranged in succession. That is, a single solid battery 22b may cover side surfaces of two or more liquid batteries 10. At least one liquid battery 10 may not be in contact with any solid battery 22b. One or more support members that support the plurality of liquid batteries 10, the plurality of solid batteries 22b, and the plurality of solid batteries 20 may be provided in the battery case 30.

Fourth Embodiment

Figure 6:
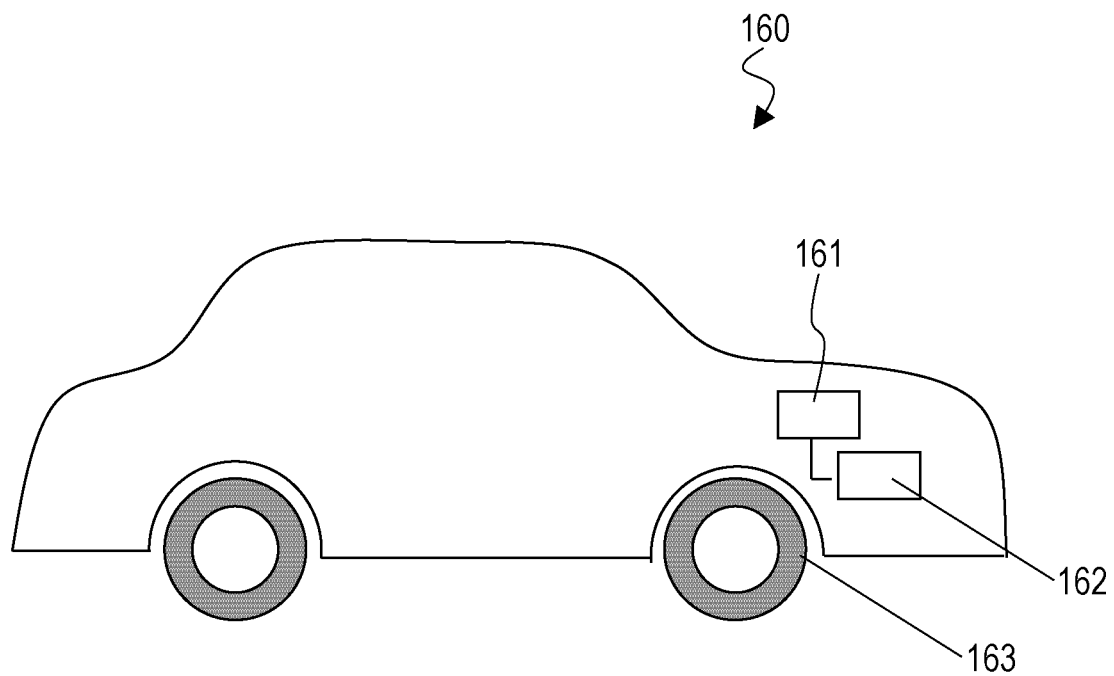
FIG. 6 schematically illustrates the structure of a vehicle according to a fourth embodiment.

FIG. 6 schematically illustrates the structure of a vehicle according to a fourth embodiment. A vehicle 160 in the fourth embodiment is, for example, an electric vehicle. The vehicle 160 has an electric motor 161, a battery module 162, and wheels 163. The battery module 162 is the battery module in any one the embodiments and variations described above. The battery module 162 supplies electric power to the electric motor 161 to drive the electric motor 161. The electric motor 161 rotates the wheels 163 to move the vehicle 160. The vehicle 160 may be another automobile such as a hybrid car. Alternatively, the vehicle 160 may be another vehicle such as an electric train, an airplane, or a ship.

In the structure described above, the electric motor 161 is driven by electric power supplied from the highly reliable battery module 162 that suppresses the spread of fire from one liquid battery 10 to other liquid batteries 10, so it possible to move persons and luggage in a safe manner.

OTHER EMBODIMENTS

So far, embodiments have been described. However, the present disclosure is not limited to these embodiments. The present disclosure also includes embodiments in which various variations that a person having ordinary skill in the art thinks of are applied to the embodiments and variations described above. The present disclosure further includes embodiments in which any constituent elements and functions described in the above first to fourth embodiments and variations are combined without departing from the intended scope of the present disclosure.

What is claimed is:

1. A battery module comprising:
a first liquid electrolyte battery, which is a unit cell that has a first surface; and
a first solid electrolyte battery, which is a unit cell that has a second surface facing the first surface of the first liquid electrolyte battery,
wherein an area of the second surface is greater than that of the first surface.

2. The battery module according to claim 1, wherein the first solid electrolyte battery is disposed in contact with the first liquid electrolyte battery.

3. The battery module according to claim 1, wherein
the first liquid electrolyte battery has a third surface opposite to the first surface,
the battery module further comprises a second solid electrolyte battery, which is a unit cell that has a fourth surface facing the third surface of the first liquid electrolyte battery,
an area of the fourth surface is greater than that of the third surface, and
the first liquid electrolyte battery is disposed between the first solid electrolyte battery and the second solid electrolyte battery.

4. The battery module according to claim 3, wherein the second solid electrolyte battery is disposed in contact with the first liquid electrolyte battery.

5. The battery module according to claim 3, further comprising a battery case that accommodates the first liquid electrolyte battery, the first solid electrolyte battery, and the second solid electrolyte battery, wherein:
the first solid electrolyte battery, the second solid electrolyte battery, and the battery case define a closed space; and
the first liquid electrolyte battery is disposed in the closed space.

6. The battery module according to claim 3, further comprising a battery case having inner surfaces, the battery case accommodating the first liquid electrolyte battery, the first solid electrolyte battery, and the second solid electrolyte battery, wherein:
the first solid electrolyte battery has at least one side surface that is in contact with at least one of the inner surfaces of the battery case;
the second solid electrolyte battery has at least one side surface that is in contact with the at least one of the inner surfaces of the battery case; and
the first liquid electrolyte battery is disposed in a closed space enclosed by the second surface of the first solid electrolyte battery, the fourth surface of the second solid electrolyte battery, and the at least one of the inner surfaces of the battery case.

7. The battery module according to claim 1, wherein
the first liquid electrolyte battery has: the first surface covered by the second surface of the first solid electrolyte battery; and at least one side surface covered by the second surface of the first solid electrolyte battery.

8. The battery module according to claim 1, further comprising a third solid electrolyte battery, which is a unit cell, wherein
the first liquid electrolyte battery has: the first surface covered by the second surface of the first solid electrolyte battery; and at least one side surface covered by the third solid electrolyte battery.

9. The battery module according to claim 1, wherein:
the first liquid electrolyte battery includes an electrolyte solution including an organic substance;
the first solid electrolyte battery includes a solid electrolyte;
the first liquid electrolyte battery includes no solid electrolyte; and
the first solid electrolyte battery includes no electrolyte solution.

10. The battery module according to claim 1, wherein
the first solid electrolyte battery has a third surface opposite to the second surface,
the battery module further comprises a second liquid electrolyte battery, which is a unit cell that has a fourth surface facing the third surface of the first solid electrolyte battery, and
the first solid electrolyte battery is disposed between the first liquid electrolyte battery and the second liquid electrolyte battery.

11. The battery module according to claim 10, wherein the second liquid electrolyte battery is disposed in contact with the first solid electrolyte battery.

12. The battery module according to claim 10, wherein an area of the fourth surface of the second liquid electrolyte battery is smaller than that of the third surface of the first solid electrolyte battery.

13. The battery module according to claim 1, wherein:
the first liquid electrolyte battery includes an electrolyte solution including an organic substance;
the first solid electrolyte battery includes a solid electrolyte;
the first liquid electrolyte battery includes a smaller amount, in mass, of the solid electrolyte than an amount, in mass, of the solid electrolyte in the first solid electrolyte battery; and
the first solid electrolyte battery includes a smaller amount, in mass, of the electrolyte solution than an amount, in mass, of the electrolyte solution in the first liquid electrolyte battery.

14. A battery module comprising:
a plurality of batteries including:
a first liquid electrolyte battery, which is a unit cell that has a first surface and a second surface opposite to the first surface;
a first solid electrolyte battery, which is a unit cell that has a third surface facing the first surface of the first liquid electrolyte battery; and
a second solid electrolyte battery, which is a unit cell that has a fourth surface facing the second surface of the first liquid electrolyte battery, wherein
an area of the third surface is greater than that of the first surface,
an area of the fourth surface is greater than that of the second surface, and
the first liquid electrolyte battery is disposed between the first and second solid electrolyte batteries, such that the first and second solid electrolyte batteries form first and second ends of the plurality of batteries.

15. The battery module according to claim 14, wherein
the first solid electrolyte battery is disposed in contact with the first liquid electrolyte battery, and
the second solid electrolyte battery is disposed in contact with the first liquid electrolyte battery.

16. The battery module according to claim 14, further comprising a battery case that accommodates the first liquid electrolyte battery, the first solid electrolyte battery, and the second solid electrolyte battery, wherein:

the first solid electrolyte battery, the second electrolyte battery, and the battery case define a closed space; and the first liquid electrolyte battery is disposed in the closed space.

17. The battery module according to claim 14, further comprising a battery case having inner surfaces, the battery case accommodating the first liquid electrolyte battery, the first solid electrolyte battery, and the second solid electrolyte battery, wherein:

the first solid electrolyte battery has at least one side surface that is in contact with at least one of the inner surfaces of the battery case;

the second solid electrolyte battery has at least one side surface that is in contact with the at least one of the inner surfaces of the battery case; and the first liquid electrolyte battery is disposed in a closed space enclosed by the third surface of the first solid electrolyte battery, the fourth surface of the second solid electrolyte battery, and the at least one of the inner surfaces of the battery case.

18. The battery module according to claim 16, wherein the first liquid electrolyte battery is not in contact with the battery case.

* * * * *